United States Patent
Yu et al.

(10) Patent No.: US 9,332,438 B2
(45) Date of Patent: May 3, 2016

(54) METHOD FOR UPDATING GROUP TEMPORAL KEY, RELATED APPARATUS AND SYSTEM

(71) Applicant: HUAWEI DEVICE CO., LTD., Shenzhen (CN)

(72) Inventors: Kecheng Yu, Shenzhen (CN); Zhiming Ding, Shenzhen (CN); Ping Fang, Shenzhen (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 175 days.

(21) Appl. No.: 14/063,232

(22) Filed: Oct. 25, 2013

(65) Prior Publication Data

US 2014/0119543 A1    May 1, 2014

(30) Foreign Application Priority Data

Oct. 25, 2012  (CN) .......................... 2012 1 0413009

(51) Int. Cl.
*H04L 9/00* (2006.01)
*H04W 12/08* (2009.01)
*H04L 29/06* (2006.01)
*H04W 12/04* (2009.01)
*H04W 88/08* (2009.01)

(52) U.S. Cl.
CPC .............. *H04W 12/08* (2013.01); *H04L 63/068* (2013.01); *H04W 12/04* (2013.01); *H04L 63/065* (2013.01); *H04W 88/08* (2013.01)

(58) Field of Classification Search
CPC .................................................. H04W 12/08
See application file for complete search history.

(56) References Cited

U.S. PATENT DOCUMENTS

| | | | |
|---|---|---|---|
| 7,890,745 B2* | 2/2011 | Qi et al. ........................ | 713/150 |
| 7,907,734 B2* | 3/2011 | Nishida et al. ................ | 380/277 |
| 2003/0206637 A1 | 11/2003 | Caronni et al. | |

(Continued)

FOREIGN PATENT DOCUMENTS

| | | |
|---|---|---|
| CN | 101030849 | 9/2007 |
| CN | 101102552 | 1/2008 |
| CN | 101141789 | 3/2008 |

(Continued)

OTHER PUBLICATIONS

International Search Report and Written Opinion, dated Jan. 23, 2014, in corresponding International Application No. PCT/CN2013/085785 (11 pp.).

*Primary Examiner* — Brandon Hoffman
*Assistant Examiner* — Helai Salehi
(74) *Attorney, Agent, or Firm* — Staas & Halsey LLP

(57) ABSTRACT

Embodiments of the present invention disclose a method for updating a group temporal key, a related apparatus and system. A method includes: An access point AP sets an updating period of a group temporal key GTK; the access point updates the GTK whenever the updating period of the GTK arrives; the access point receives a GTK request that is sent by a mobile station STA in an association list within a preset delay time period after arrival of the updating period of the GTK, where the association list records all mobile stations communicating with the access point, and the preset delay time period is shorter than the updating period of the GTK; and when the preset delay time period after the arrival of the updating period of the GTK arrives, the access point sends the updated GTK to the mobile station in the association list according to the GTK request.

11 Claims, 4 Drawing Sheets

(56) References Cited

U.S. PATENT DOCUMENTS

2006/0067526 A1* 3/2006 Faccin et al. .................. 380/46
2013/0283360 A1* 10/2013 Hui et al. ......................... 726/6

FOREIGN PATENT DOCUMENTS

| CN | 101382435 | 3/2009 |
| CN | 101692637 | 4/2010 |

* cited by examiner

METHOD FOR UPDATING GROUP TEMPORAL KEY, RELATED APPARATUS AND SYSTEM

CROSS-REFERENCE TO RELATED APPLICATION

This application claims priority to Chinese Patent Application No. 201210413009.6, filed on Oct. 25, 2012, which is hereby incorporated by reference in its entirety.

TECHNICAL FIELD

The present invention relates to the field of communications technologies, and in particular, to a method for updating a group temporal key, and a related apparatus and system.

BACKGROUND

A wireless fidelity (Wireless Fidelity, WiFi) technology will be popularized in and applied to the field of an intelligent transport system (Intelligent Transport System, ITS). The European Telecommunications Standards Institute (European Telecommunications Standards Institute, ETSI) claims that 802.11p of the Institute of Electrical and Electronics Engineers (Institute of Electrical and Electronics Engineers, IEEE) is used as a communications standard for an intelligent transport system.

As WiFi hotspots, that is, access points (Access Point, AP), continuously increase, WiFi network complete coverage in many cities will be realized. A WiFi transceiver module (which is equivalent to a mobile station (STA, Station)) is installed in a vehicle, such as a car, to receive real-time traffic information from a WiFi network, and WiFi network operators may charge a driver subscriber for a certain fee as a network deploying cost and network maintenance fee. A subscriber who has paid can acquire a legal certificate, and a legal STA can obtain real-time traffic information with a relatively low expense for determining a driving route in combination with navigation information.

After verifying the validity of a subscriber, a server on a WiFi network side negotiates a PTK (Pairwise Transient Key, PTK, pairwise transient key) and a group temporal key (Group Temporal Key, GTK) with the subscriber. The PTK is used for encrypting and decrypting a unicast information frame transmitted between an STA and an AP, and the GTK is used for encrypting and decrypting a broadcast information frame transmitted between an STA and an AP.

After an STA moves from an old AP to a new AP, the STA needs to acquire a GTK from the new AP for decrypting broadcast information sent by the new AP. Meanwhile, the STA leaves the old AP, and therefore, the GTK must be timely updated once an STA leaves an old AP according the stipulation of the IEEE 802.11 standard.

In the prior art, when an STA quits from a basic service set (Basic Service Set, BSS), that is, a wireless local area network, or after a GTK aging time arrives, an AP updates the GTK of the BSS, and sends the updated GTK to all STAs still in the BSS in a unicast manner.

During the implementation of the present invention, the inventor of the present invention finds that: In the prior art, in a WiFi network formed by one AP and several STAs, if an STA leaves, the AP needs to timely update a GTK, and such a GTK update mechanism applies to only a situation in which an STA position is relatively fixed. However, on a road with heavy traffic, a large number of cars installed with an STA leaves one AP for every second, and enters the coverage of another AP. One AP may be associated with a maximum of 2007 STAs. If a plurality of STAs leaves the coverage of an AP for every second, the AP needs to timely update a GTK when each STA leaves. In this case, if an AP timely updates a GTK when each STA leaves, the AP may only be busy with updating the GTK, rather than providing another service for an STA.

SUMMARY

The embodiments of the present invention provide a method for updating a group temporal key, and a related apparatus and system, so as to implement update of a GTK in a BSS without increasing an additional load of an access point.

To solve the foregoing technical problem, the embodiments of the present invention provide the following technical solutions:

In a first aspect, an embodiment of the present invention provides a method for updating a group temporal key, including:

setting, by an access point AP, an updating period of a group temporal key GTK;

updating, by the access point, the GTK whenever the updating period of the GTK arrives;

receiving, by the access point, a GTK request that is sent by a mobile station STA in an association list within a preset delay time period after arrival of the updating period of the GTK, where the association list records all mobile stations communicating with the access point, and the preset delay time period is shorter than the updating period of the GTK; and sending, by the access point, the updated GTK to the mobile station in the association list according to the GTK request when the preset delay time period after the arrival of the updating period of the GTK arrives.

In combination with the first aspect, in a first possible implementation manner of the first aspect, the method further includes: adding, by the access point, a newly associated mobile station into the association list when a mobile station associates with the access point;

receiving, by the access point, a GTK request sent by the newly associated mobile station; and sending, by the access point, both an old GTK and the updated GTK to the newly associated mobile station when the access point has updated the GTK but still uses the old GTK, so that the newly associated mobile station uses the old GTK when the preset delay time period after the arrival of the updating period of the GTK does not arrive, and uses the updated GTK after the preset delay time period after the arrival of the updating period of the GTK arrives.

In combination with the first aspect, in a second possible implementation manner of the first aspect, the method further includes: adding, by the access point, a newly associated mobile station into the association list when a mobile station associates with the access point;

receiving, by the access point, a GTK request sent by the newly associated mobile station; and sending, by the access point, an old GTK to the newly associated mobile station when the access point has not updated the GTK and stills uses the old GTK, so that the newly associated mobile station uses the old GTK when the preset delay time period after the arrival of the updating period of the GTK does not arrive, and sends a GTK request to the access point within the preset delay time period after the arrival of the updating period of the GTK.

In a second aspect, an embodiment of the present invention further provides another method for updating a group temporal key, including:

setting, by a first mobile station STA, a requesting period of a group temporal key GTK; and sending, by the first mobile station, within a preset delay time period each time after arrival of the requesting period of the GTK, a GTK request to an access point AP associated with the first mobile station, so that the access point assigns a GTK to the first mobile station, where an updating period of the GTK set by the access point is the same as the requesting period of the GTK.

In combination with the second aspect, in a first possible implementation manner of the second aspect, the method further includes: sending, by a second mobile station, a GTK request to the access point when the second mobile station associates with the access point; and receiving, by the second mobile station, an updated GTK and an old GTK that is still used, where the updated GTK and the old GTK are sent by the access point, so that the second mobile station uses the old GTK when the preset delay time period after the arrival of the requesting period of the GTK does not arrive, and uses the updated GTK after the preset delay time period after the arrival of the requesting period of the GTK arrives.

In combination with the second aspect, in a second possible implementation manner of the second aspect, the method further includes: sending, by a second access point, a GTK request to the access point when the second mobile station associates with the access point; and receiving, by the second mobile station, an old GTK that is still used and sent by the access point, so that the second mobile station uses the old GTK when the preset delay time period after the arrival of the requesting period of the GTK does not arrive, and sends a GTK request to the access point within the preset delay time period after the arrival of the requesting period of the GTK.

In a third aspect, an embodiment of the present invention further provides another method for updating a group temporal key, including:

setting, by an access point AP, an updating period of a group temporal key GTK; and updating, by the access point, the GTK whenever the updating period of the GTK arrives, and sending, by the access point, the updated GTK to a mobile station STA in an association list, where the association list records all mobile stations communicating with the access point.

In combination with the third aspect, in a first possible implementation manner of the third aspect, the method further includes: deleting, by the access point, a leaving mobile station from the association list when a mobile station leaves the coverage of the access point, so that the updated GTK is not sent to the leaving mobile station when the updating period of the GTK arrives.

In combination with the third aspect or the first possible implementation manner of the third aspect, in a second possible implementation manner, the method further includes:

adding, by the access point, a newly associated mobile station into the association list when a mobile station associates with the access point.

In a fourth aspect, an embodiment of the present invention further provides an access point (AP, Access Point), including:

a period setting unit, configured to set an updating period of a group temporal key GTK;

an updating unit, configured to update the GTK whenever the updating period of the GTK arrives;

a receiving unit, configured to receive a GTK request that is sent by a mobile station STA in an association list within a preset delay time period after arrival of the updating period of the GTK, where the association list records all mobile stations communicating with the access point, and the preset delay time period is shorter than the updating period of the GTK; and a sending unit, configured to send the updated GTK to the mobile station in the association list according to the GTK request when the preset delay time period after the arrival of the updating period of the GTK arrives.

In combination with the fourth aspect, in a first possible implementation manner of the fourth aspect, the updating unit is further configured to add a newly associated mobile station into the association list when a mobile station associates with the access point;

the receiving unit is further configured to receive a GTK request sent by the newly associated mobile station; and the sending unit is further configured to send both an old GTK and the updated GTK to the newly associated mobile station when the access point has updated the GTK but still uses the old GTK, so that the newly associated mobile station uses the old GTK when the preset delay time period after the arrival of the updating period of the GTK does not arrive, and uses the updated GTK after the preset delay time period after the arrival of the updating period of the GTK arrives.

In combination with the fourth aspect, in a second possible implementation manner of the fourth aspect, the updating unit is further configured to add a newly associated mobile station into the association list when a mobile station associates with the access point;

the receiving unit is further configured to receive a GTK request sent by the newly associated mobile station; and the sending unit is further configured to send an old GTK to the newly associated mobile station when the access point has not updated the GTK and stills uses the old GTK, so that the newly associated mobile station uses the old GTK when the preset delay time period after the arrival of the updating period of the GTK does not arrive, and sends a GTK request to the access point within the preset delay time period after the arrival of the updating period of the GTK.

In a fifth aspect, an embodiment of the present invention further provides a mobile station, including:

a period setting unit, configured to set a requesting period of a group temporal key GTK; and a sending unit, configured to send, within a preset delay time period each time after arrival of the requesting period of the GTK, a GTK request to an access point AP associated with the mobile station, so that the access point assigns a GTK to the mobile station, where an updating period of the GTK set by the access point is the same as the requesting period of the GTK.

In a eighth aspect, an embodiment of the present invention further provides a mobile station, including:

a period setting unit, configured to set a requesting period of a group temporal key GTK;

a sending unit, configured to send a GTK request to an access point when the mobile station associates with the access point, so that the access point assigns a GTK to the mobile station, wherein an updating period of the GTK set by the access point is the same as the requesting period of the GTK; and a first receiving unit, configured to receive an updated GTK and an old GTK that is still used, wherein the updated GTK and the old GTK are sent by the access point, so that the mobile station uses the old GTK when the preset delay time period after the arrival of the requesting period of the GTK does not arrive, and uses the updated GTK after the preset delay time period after the arrival of the requesting period of the GTK arrives.

In a ninth aspect, an embodiment of the present invention further provides a mobile station, including:

a period setting unit, configured to set a requesting period of a group temporal key GTK;

a sending unit, configured to send a GTK request to an access point when the mobile station associates with the access point, so that the access point assigns a GTK to the mobile station, wherein an updating period of the GTK set by the access point is the same as the requesting period of the GTK;

a second receiving unit, configured to receive an old GTK that is still used and sent by the access point, so that the mobile station uses the old GTK when the preset delay time period after the arrival of the requesting period of the GTK does not arrive; and the sending unit is further configured to send a GTK request to the access point within the preset delay time period after the arrival of the requesting period of the GTK.

In a sixth aspect, an embodiment of the present invention further provides a system for updating a group temporal key, including: the access point according to the fourth aspect and the mobile station according to the fifth aspect; or, the access point according to the first possible implementation manner of the fourth aspect and the mobile station according to the eighth aspect; or, the access point according to the second possible implementation manner of the fourth aspect and the mobile station according to the ninth aspect.

In a seventh aspect, an embodiment of the present invention further provides another access point, including:

a period setting unit, configured to set an updating period of a group temporal key GTK;

an updating unit, configured to update the GTK whenever the updating period of the GTK arrives; and a sending unit, configured to send the updated GTK to a mobile station STA in an association list after the update of the GTK is completed, where the association list records all mobile stations communicating with the access point.

In combination with the seventh aspect, in a first possible implementation manner of the seventh aspect, the updating unit is further configured to delete a leaving mobile station from the association list when a mobile station leaves the coverage of the access point, so that the updated GTK is not sent to the leaving mobile station when the updating period of the GTK arrives.

In combination with the seventh aspect, in a second possible implementation manner of the seventh aspect, the updating unit is further configured to add a newly associated mobile station into the association list when a mobile station associates with the access point.

It can be seen from the foregoing technical solutions that, the embodiments of the present invention have the following advantages:

In an embodiment of the present invention, an access point sets an updating period of a GTK and periodically updates the GTK. A mobile station associated with the access point sends a GTK request to the access point, and the access point sends the updated GTK to the mobile station after receiving the request, so that it is unnecessary for the access point to update the GTK whenever a mobile station leaves the access point, thereby avoiding frequent update of the GTK, and preventing the access point from working with an overload.

In another embodiment of the present invention, an access point sets an updating period of a GTK. Whenever the updating period of the GTK arrives, the access point updates the GTK. After the update of the GTK is completed, the access point sends the updated GTK according to an association list to a mobile station in the association list, so that it is unnecessary to update the GTK whenever a mobile station leaves the access point, thereby avoiding frequent update of the GTK, and preventing the access point from working with an overload.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show only some embodiments of the present invention, and persons of ordinary skill in the art may still derive other drawings from these accompanying drawings without creative efforts.

DESCRIPTION OF EMBODIMENTS

The embodiments of the present invention provide a method for updating a group temporal key, and a related apparatus and system, so as to implement update of a GTK in a BSS without increasing an additional load of an access point.

To make the objectives, features, and advantages of the present invention more obvious and comprehensible, the following clearly describes the technical solutions in the embodiments of the present invention with reference to the accompanying drawings in the embodiments of the present invention. Apparently, the embodiments to be described are only a part rather than all of the embodiments of the present invention. All other embodiments obtained by persons skilled in the art based on the embodiments of the present invention shall fall within the protection scope of the present invention.

For a method for updating a group temporal key provided in an embodiments of the present invention, executors involved in the method are an access point (AP, Access Point) and a mobile station (STA, station), and the following describes an interactive process between an access point and a mobile station. The following separately introduces methods executed by an access point and by a mobile station. A detailed introduction from a viewpoint of an access point is first provided, and then a mobile station is described in detail in a subsequent embodiment.

Figure 1:
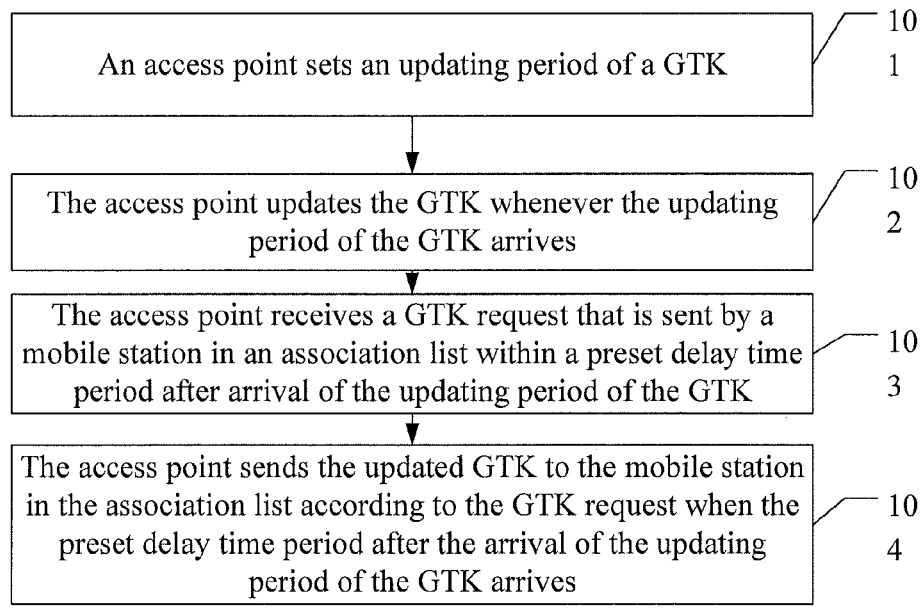
FIG. 1 is a block schematic flowchart of a method for updating a group temporal key according to an embodiment of the present invention.

A method for updating a group temporal key provided in an embodiment of the present invention, as shown in FIG. 1, includes:

101: An access point sets an updating period of a GTK.

In the embodiment of the present invention, one or more mobile stations exist in the coverage of the access point. All mobile stations communicating with the access point are recorded in an association list of the access point. Before a mobile station communicates with the access point, the mobile station and the access point need to undergo an association process. The access point sends a GTK with 256 bits to the mobile station during the association process. The GTK is a group of global encryption keys, and all mobile stations communicating with the access point use the same GTK. The access point uses this GTK to encrypt all broadcast packets, and the mobile station uses this GTK to decrypt a broadcast packet sent by the access point. To ensure information security, the access point may update the GTK.

In the field of an intelligent transport system, a vehicle such as a car is installed with a mobile station (STA, Station), which is also called a WiFi transceiver module generally and is used to receive real-time traffic information from a WiFi network so as to provide reference of routing for a car driver. When a car driver drives a car on a road, a mobile station goes into and out of a plurality of access points. According to an implementation manner in the prior art, whenever a mobile station leaves an access point, the access point updates a GTK to ensure information security. In this way, if there is a plurality of mobile stations leaving a GTK one by one in the same period, the access point needs to update the GTK for a plurality of times, thereby greatly increasing a load of the access point.

In the embodiment of the present invention, a manner that the access point updates the GTK is setting an updating period of the GTK rather than updating the GTK immediately whenever a mobile station leaves the access point, that is, periodically updating the GTK. In addition, the updating period of the GTK may be determined through negotiation between the access point and a server on a network side. Specifically, the access point may set the updating period of the GTK to one minute, which indicates that the access point generates a new GTK for every one minute. In such a manner of periodically updating the GTK, it is unnecessary to update the GTK whenever a mobile station leaves the access point, thereby avoiding increasing an additional load of the access point.

102: The access point updates the GTK whenever the updating period of the GTK arrives.

After the setting of the updating period of the GTK is completed, the access point starts to time. Whenever the updating period arrives, the access point updates the GTK, that is, generates a new GTK. For example, if the updating period of the GTK is set to one minute, and after a timer starts to time, the access point generates a new GTK for every one minute.

103: The access point receives a GTK request that is sent by a mobile station in an association list within a preset delay time period after arrival of the updating period of the GTK, where the association list records all mobile stations communicating with the access point, and the preset delay time period is shorter than the updating period of the GTK.

In the embodiment of the present invention, a mobile station associated with the access point may also set a requesting period of a GTK, where the requesting period of the GTK keeps a consistent phase (Phase, phase) with the updating period of the GTK set by the access point, and period values are the same. Both of the access point and the mobile station set a preset delay time period, where the preset delay time period is shorter than the updating period of the GTK. The mobile station sends a GTK request to its associated access point within the preset delay time period after arrival of the updating period of the GTK, where the GTK request is used for requesting the access point to assign a GTK. For example, if the updating period of the GTK is set to one minute, the preset delay time period may be set to 0.1 minute. In this way, within the 0.1 minute after arrival of the updating period of the GTK of one minute, the mobile station may initiate a GTK request to the access point.

In the embodiment of the present invention, a mobile station in the association list sends a GTK request to the access point, and the access point may receive the GTK request sent by the mobile station in the association list. Because the association list maintains all mobile stations communicating with the access point in the coverage of the access point, when a mobile station leaves the access point, the access point may delete the mobile station from the association list. In other words, a leaving mobile station cannot send a GTK request to the access point the mobile station leaves.

104: The access point sends the updated GTK to the mobile station in the association list according to the GTK request when the preset delay time period after the arrival of the updating period of the GTK arrives.

In the embodiment of the present invention, the access point sends the updated GTK to the mobile station in the association list according to the received GTK request when the preset delay time period after the arrival of the updating period of the GTK arrives, where the mobile station in the association list sends the GTK request. In a practical application, after four times of handshaking between an access point and a mobile station succeed, the access point may send an updated GTK to each of all mobile stations in an association list in a unicast manner.

It should be noted that, in the embodiment of the present invention, after the access point updates the GTK, the access point does not start to use the updated GTK immediately. A mobile station need to send a GTK request to the access point, and then the access point sends a GTK based on the GTK request to the mobile station that sends the GTK request. In other words, in the embodiment of the present invention, the access point sends a GTK based on a request, which is a totally different implementation manner from a manner for updating a GTK whenever a mobile station leaves in the prior art. After the access point sends the updated GTK to the mobile station, the access point starts to use the updated GTK for encrypting a broadcast information frame between the access point and the mobile station.

It should be noted that, in the foregoing embodiment, a method for updating a GTK between an access point and a mobile station that has entered the coverage of the access point and is communicating with the access point is described. The embodiment of the present invention may further include a processing manner between an access point and a mobile station that just enters the coverage of the access point and is associating with the access point. At this time, the association list does not include a newly associated mobile station, and the method provided in the embodiment of the present invention may further include the following steps:

A1: The access point adds a newly associated mobile station into the association list when a mobile station associates with the access point.

A2: The access point receives a GTK request sent by the newly associated mobile station.

A3: The access point sends both an old GTK and the updated GTK to the newly associated mobile station when the access point has updated the GTK but still uses the old GTK, so that the newly associated mobile station uses the old GTK when the preset delay time period after the arrival of the updating period of the GTK does not arrive, and uses the updated GTK after the preset delay time period after the arrival of the updating period of the GTK arrives.

For step A1, when a new mobile station associates with the access point, the access point may update the association list, and add the newly associated mobile station into the association list. In step A2, when a new mobile station associates with the access point, the new mobile station first sends a GTK request to the access point for requesting the access point to assign a GTK. In step A3, when receiving the GTK request, the access point determines a state of the access point at this time. If the access point has updated the GTK but still uses an old GTK, the access point sends both the old GTK and the updated GTK to the newly associated mobile station. Because a newly generated GTK is started to be used after being delayed for a period of time (that is, a preset delay time period) rather than being immediately used, the newly associated mobile station uses the old GTK when the preset delay time period after the arrival of the updating period of the GTK does not arrive, and uses the updated GTK after the preset delay time period after the arrival of the updating period of the GTK arrives.

Figure 2:
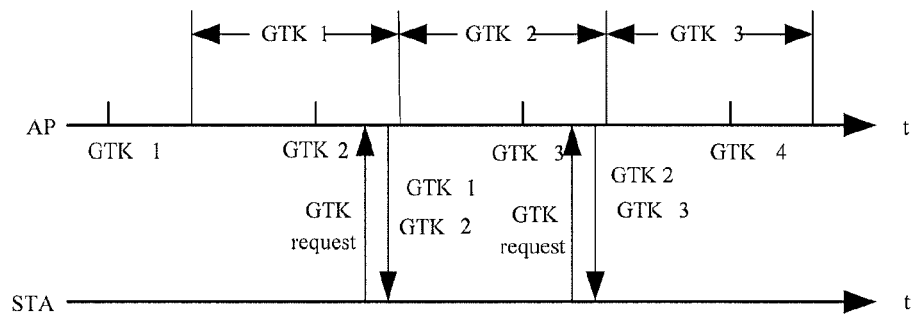
FIG. 2 is a schematic diagram of a method for periodically updating a GTK by an access point and a mobile station according to an embodiment of the present invention.

To describe steps A1 to A3 more clearly, the following uses a practical application scenario as an example for a detailed description. Referring to FIG. 2, FIG. 2 is a schematic diagram of a method for periodically updating a GTK by an access point and a mobile station. In this embodiment, an AP updates a GTK periodically, and an STA periodically sends a request to the AP, where an updating period of the GTK is the same as a GTK request sending period. For example, both are one minute. In FIG. 2, a horizontal axis represents time. On a time axis corresponding to the AP, a GTK1 represents a time point at which the GTK1 is generated, and a GTK2 represents a time point at which the GTK2 is generated. A newly generated GTK is used after being delayed for a preset delay time period such as 0.1 minute rather than being immediately used. Time of using each GTK is consistent with time of updating the GTK. When an STA associates with the AP, the STA performs four times of handshaking with the AP, and the STA sends a GTK request to the AP. At this time, the AP has generated a latest GTK2 but still uses the GTK1. In this case, the AP sends both the GTK1 that is currently used and the newly generated GTK2 to the STA. After the mobile station associates with the access point successfully, and the mobile station sends a GTK request for a second time, the AP may send only a GTK3, and may also send the GTK 2 and a GTK 3, and only the latter is shown in FIG. 2. In broadcast information of the AP, there may be a group temporal key identifier (GTK ID), and the STA may determine, according to the GTK ID, which GTK is used to decrypt the broadcast information.

It should be noted that, the embodiment of the present invention may further include a processing manner between an access point and a mobile station that just enters the coverage of the access point and is associating with the access point. At this time, the association list does not include a newly associated mobile station, and the method provided in the embodiment of the present invention may further include the following steps:

B1: The access point adds a newly associated mobile station into the association list when a mobile station associates with the access point.

B2: The access point receives a GTK request sent by the newly associated mobile station.

B3: The access point sends an old GTK to the newly associated mobile station when the access point has not updated the GTK and stills uses the old GTK, so that the newly associated mobile station uses the old GTK when the preset delay time period after the arrival of the updating period of the GTK does not arrive, and sends a GTK request to the access point within the preset delay time period after the arrival of the updating period of the GTK.

Steps B1 and B2 are the same as steps A1 and A2 in the foregoing. For step B3, when receiving the GTK request, the access point determines a state of the access point at this time. If the access point has not updated the GTK but still uses an old GTK, the access point sends the old GTK to the newly associated mobile station. Because a newly generated GTK is started to be used after being delayed for a period of time (that is, a preset delay time period) rather than being immediately used, the newly associated mobile station uses the old GTK when the preset delay time period after the arrival of the updating period of the GTK does not arrive, and sends a GTK request to the access point within the preset delay time period after the arrival of the updating period of the GTK, so as to request a latest GTK from the access point.

Figure 3:
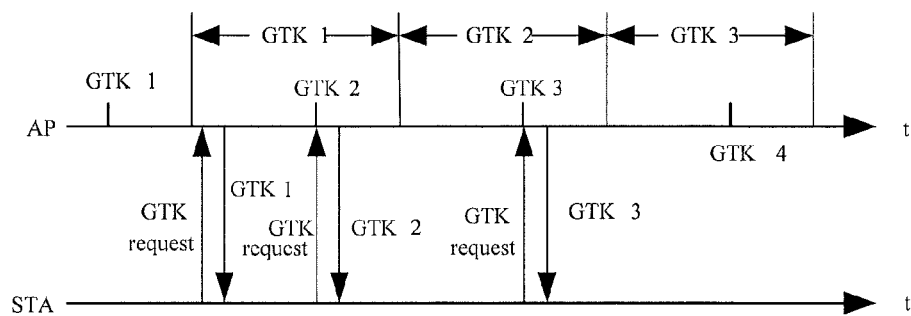
FIG. 3 is a schematic diagram of another method for periodically updating a GTK by another access point and a mobile station according to an embodiment of the present invention.

To describe steps B1 to B3 more clearly, the following uses a practical application scenario as an example for a detailed description. Referring to FIG. 3, FIG. 3 is a schematic diagram of another method for periodically updating a GTK by an access point and a mobile station. In this embodiment, an AP updates a GTK periodically, and an STA periodically sends a request to the AP, where an updating period of the GTK is the same as a GTK request sending period. For example, both are one minute. In FIG. 3, a horizontal axis represents time. On a time axis corresponding to the AP, a GTK1 represents a time point at which the GTK1 is generated, and a GTK2 represents a time point at which the GTK2 is generated. A newly generated GTK is used after being delayed for a preset delay time period such as 0.1 minute rather than being immediately used. Time of using each GTK is consistent with time of updating the GTK. If the STA enters the coverage of the AP after the GTK1 is started to be used and before the GTK2 is generated, the STA performs four times of handshaking with the AP, and the STA sends a GTK request to the AP. At this time, the AP has not updated the GTK but still uses the GTK1. After the STA performs four times of handshaking with the AP, the AP sends the GTK1 that has been generated and is being used to the STA. When the AP updates the GTK and generates the GTK2, the STA sends a GTK request to the AP. The AP sends the GTK2 to the STA, and the STA has two GTKs at this time. Before the AP uses the GTK2, the STA still uses the GTK1, and after the AP uses the GTK2, the STA also starts to use the GTK2. When the AP uses the GTK2 to encrypt broadcast information, the STA may use the GTK2 to decrypt the broadcast information. Afterwards, a time point at which the STA requests a GTK may always keep synchronization with a time point at which the AP updates the GTK. It should be noted that, a time point at which the STA sends a GTK request to the AP may also be a little later than a time point at which the AP generates the GTK2, as long as the GTK2 is sent to the STA before the AP uses the GTK2.

In the embodiment of the present invention, an access point sets an updating period of a GTK and periodically updates the GTK. After receiving a GTK request sent by a mobile station associated with the access point, the access point sends the updated GTK to the mobile station, so that it is unnecessary to update the GTK whenever a mobile station leaves the access point, thereby avoiding frequent update of the GTK, and preventing the access point from working with an overload.

Figure 4:
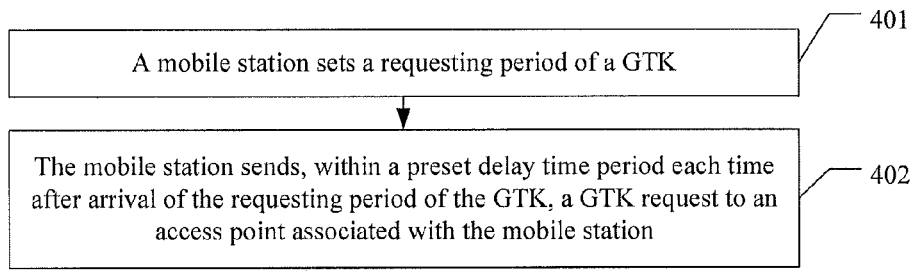
FIG. 4 is a block schematic flowchart of another method for updating a group temporal key according to an embodiment of the present invention.

The foregoing embodiment describes an interactive process between an access point and a mobile station with an access point end working as an executor. The following describes a case that a mobile station end is used as an executor in detail. Referring to FIG. 4, an embodiment of the present invention provides a method for updating a group temporal key, including:

Step 401: A mobile station sets a requesting period of a GTK.

In the embodiment of the present invention, one or more mobile stations existing in the coverage of an access point associates with the access point. All mobile stations communicating with the access point are recorded in an association list of the access point. When a mobile station enters the coverage of an access point and communicates with the access point, the process may be called association between the mobile station and the access point. The embodiment of the present invention describes a method for updating a GTK with one of mobile stations working as an executor. For a specific implementation for a plurality of mobile stations associated with an access point, reference may be made to the method executed by a mobile station described herein.

In the field of an intelligent transport system, a vehicle such as a car is installed with a mobile station STA, which is also called a WiFi transceiver module generally and is used to receive real-time traffic information from a WiFi network so as to provide reference of routing for a car driver. When a car driver drives a car on a road, a mobile station goes into and out of a plurality of access points. According to an implementation manner in the prior art, whenever a mobile station leaves an access point, the access point updates a GTK to ensure information security. In this way, if there is a plurality of mobile stations leaving a GTK one by one in the same period, the access point needs to update the GTK for a plurality of times, thereby greatly increasing a load of the access point.

In the embodiment of the present invention, a manner that the access point updates the GTK is setting an updating period of the GTK rather than updating the GTK immediately whenever a mobile station leaves the access point, that is, periodically updating the GTK. A mobile station requests a latest GTK from the access point, and the access point assigns a GTK to the mobile station after receiving the request, which may avoid frequent update of the GTK.

It should be noted that, in the embodiment of the present invention, the requesting period of the GTK set by the mobile station may be set by the mobile station according to a specific application scenario, and an updating period of the GTK set by the access point may keep the same as the requesting period of the GTK. For example, if the mobile station sets the requesting period of the GTK to one minute, the mobile station requests a GTK from the access point for every one minute.

Step 402: The mobile station sends, within a preset delay time period each time after arrival of the requesting period of the GTK, a GTK request to an access point associated with the mobile station, so that the access point assigns a GTK to the mobile station, where an updating period of the GTK set by the access point is the same as the requesting period of the GTK.

After the mobile station completes the setting of the requesting period of the GTK, the mobile station starts to time. Within a preset delay time period each time after arrival of the requesting period of the GTK, when the requesting period of the GTK arrives, the access point associated with the mobile station has updated the GTK. For example, when a preset delay time period set through negotiation between the mobile station and the access point is 0.1 minute and the requesting period of the GTK set by the mobile station is one minute, and after a timer starts to time, the mobile station initiates a GTK request to the access point within 0.1 minute for every one minute.

It should be noted that, in the foregoing embodiment, a method for updating a GTK between a mobile station that has entered the coverage of an access point and is communicating with the access point and the access point is described. The embodiment of the present invention may further include a processing manner between an access point and a mobile station that just enters the coverage of the access point and is associating with the access point. At this time, the association list does not include a newly associated mobile station, and the method provided in the embodiment of the present invention may further include the following steps:

C1: The mobile station sends a GTK request to the access point when the mobile station associates with the access point.

C2: The mobile station receives an updated GTK and an old GTK that is still used, where the updated GTK and the old GTK are sent by the access point, so that the mobile station uses the old GTK when the preset delay time period after the arrival of the requesting period of the GTK does not arrive, and uses the updated GTK after the preset delay time period after the arrival of the requesting period of the GTK arrives.

For step C1, when a new mobile station associates with the access point, the mobile station sends a GTK request to the access point, so that the access point assigns a GTK to the newly associated mobile station. When receiving the GTK request, the access point determines a state of the access point at this time. If the access point has updated the GTK but still uses an old GTK, the access point sends both the old GTK and the updated GTK to the newly associated mobile station. In step C2, the mobile station receives the old GTK and the updated GTK sent by the access point. Because a newly generated GTK is started to be used after being delayed for a period of time (that is, a preset delay time period) rather than being immediately used, the newly associated mobile station uses the old GTK when the preset delay time period after the arrival of the updating period of the GTK does not arrive, and uses the updated GTK after the preset delay time period after the arrival of the updating period of the GTK arrives.

It should be noted that, the embodiment of the present invention may further include a processing manner between an access point and a mobile station that just enters the coverage of the access point and is associating with the access point. At this time, the association list does not include a newly associated mobile station, and the method provided in the embodiment of the present invention may further include the following steps:

D1: The mobile station sends a GTK request to the access point when the mobile station associates with the access point.

D2: The mobile station receives an old GTK that is still used and sent by the access point, so that the mobile station uses the old GTK when the preset delay time period after the arrival of the requesting period of the GTK does not arrive, and sends a GTK request to the access point within the preset delay time period after the arrival of the requesting period of the GTK.

Step D1 and step C1 in the foregoing are the same. When receiving the GTK request, the access point determines a state of the access point at this time. If the access point has not updated the GTK but still uses an old GTK, the access point sends the old GTK to the newly associated mobile station. For step D2, the mobile station receives the old GTK sent by the access point. Because a newly generated GTK is started to be used after being delayed for a period of time (that is, a preset delay time period) rather than being immediately used, the newly associated mobile station uses the old GTK when the preset delay time period after the arrival of the updating period of the GTK does not arrive, and sends a GTK request to the access point within the preset delay time period after the arrival of the updating period of the GTK, so as to request a latest GTK from the access point.

In the embodiment of the present invention, an access point sets an updating period of a GTK and periodically updates the GTK. After receiving a GTK request sent by a mobile station associated with the access point, the access point sends the updated GTK to the mobile station, so that it is unnecessary to update the GTK whenever a mobile station leaves the access point, thereby avoiding frequent update of the GTK, and preventing the access point from working with an overload.

Figure 5:
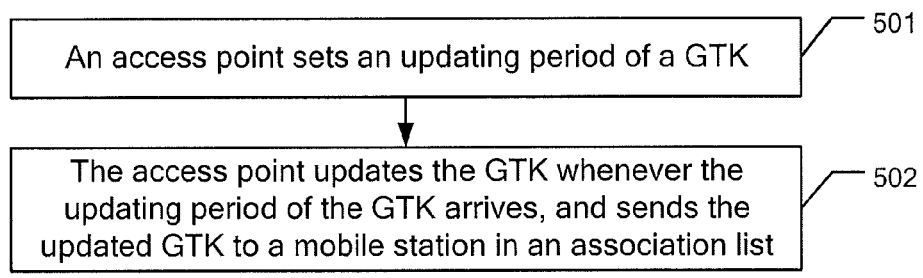
FIG. 5 is a block schematic flowchart of another method for updating a group temporal key according to an embodiment of the present invention.

The foregoing embodiment of the present invention introduces the method for updating a GTK, and describes a complete procedure of interaction between an access point and a mobile station. The following introduces another method for updating a GTK provided in an embodiment of the present invention. As shown in FIG. 5, the following steps are included:

501: An access point sets an updating period of a GTK.

In the embodiment of the present invention, a manner that the access point updates the GTK is setting an updating period of the GTK rather than updating the GTK immediately whenever a mobile station leaves the access point, that is, periodically updating the GTK. A specifically set updating period of the GTK may be set by the access point according to a specific application scenario. For example, the updating period of the GTK may be determined through negotiation between the access point and a server on a network side. Specifically, the access point may set the updating period of the GTK to one minute, which indicates that the access point generates a new GTK for every one minute. In such a manner of periodically updating the GTK, it is unnecessary to update the GTK whenever a mobile station leaves the access point, thereby avoiding increasing an additional load of the access point.

Step 502: The access point updates the GTK whenever the updating period of the GTK arrives, and sends the updated GTK to a mobile station in an association list, where the association list records all STAs communicating with the access point.

In the embodiment of the present invention, after the setting of the updating period of the GTK is completed, the access point starts to time. Whenever the updating period arrives, the access point updates the GTK, that is, generates a new GTK. For example, if the updating period of the GTK is set to one minute, and after a timer starts to time, the access point generates a new GTK for every one minute. After the update of the GTK is completed, the access point sends the updated GTK to the mobile station in the association list. In a practical application, after four times of handshaking between an access point and a mobile station succeed, the access point may send an updated GTK to each of all mobile stations in an association list in a unicast manner.

It should be noted that, in the embodiment of the present invention, the updating of the GTK by the access point is completely controlled by an updating period set by the access point. After updating the GTK, the access point immediately sends the updated GTK to the mobile station, and then the access point starts to use the updated GTK to encrypt a broadcast information frame between the access point and the mobile station.

It should be noted that, the embodiment of the present invention may include, in addition to steps 501 and 502, the following step: The access point deletes a leaving mobile station from the association list when a mobile station leaves the coverage of the access point, so that the updated GTK is not sent to the leaving mobile station when the updating period of the GTK arrives.

In addition, the embodiment of the present invention may further include the following step: The access point adds a newly associated mobile station into the association list when a mobile station associates with the access point.

Because the association list maintains all mobile stations that are communicating with the access point in the coverage of the access point, when a mobile station leaves the access point, the mobile station may be deleted from the association list. In other words, it is unnecessary for the access point to send the updated GTK to a mobile station that is not included in the association list. The access point adds a newly associated mobile station into the association list when a mobile station enters the coverage of the access point. When sending the updated GTK to the mobile station according to the association list, the access point also sends the updated GTK to the newly associated mobile station.

In the embodiment of the present invention, an access point sets an updating period of a GTK and periodically updates the GTK. After the update of the GTK is completed, the access point sends the updated GTK to a mobile station associated with the access point, so that it is unnecessary to update the GTK whenever a mobile station leaves the access point, thereby avoiding frequent update of the GTK, and preventing the access point from working with an overload.

Figure 6:
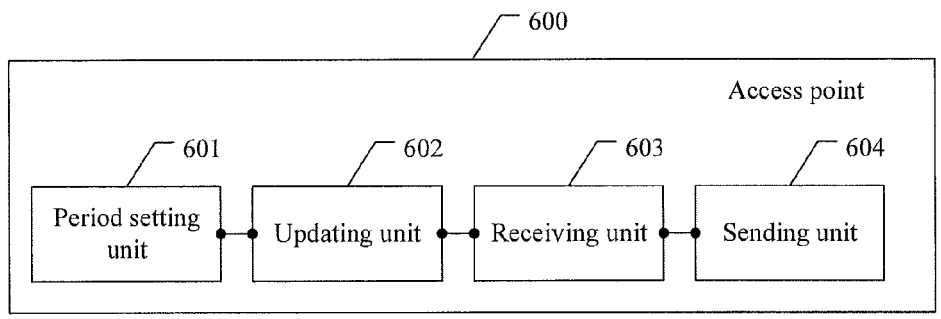
FIG. 6 is a schematic diagram of a composition structure of an access point according to an embodiment of the present invention.

The foregoing embodiments introduce the method for updating a GTK provided in the embodiments of the present invention. The following introduces an apparatus corresponding to the method. In a practical application, an access point and a mobile station provided in the embodiments of the present invention may update a GTK specifically in a manner of software or hardware integration. An embodiment of the present invention introduces an apparatus corresponding to the method introduced in the foregoing method embodiments. Reference may be made to the foregoing method embodiments for an execution method of each unit. Details about only relevant units are described herein, which are specifically as follows:

An access point provided in an embodiment of the present invention is as shown in FIG. 6. The access point 600 includes:

a period setting unit 601, configured to set an updating period of a group temporal key GTK;

an updating unit 602, configured to update the GTK whenever the updating period of the GTK arrives;

a receiving unit 603, configured to receive a GTK request that is sent by a mobile station STA in an association list within a preset delay time period after arrival of the updating period of the GTK, where the association list records all mobile stations communicating with the access point, and the preset delay time period is shorter than the updating period of the GTK; and a sending unit 604, configured to send the updated GTK to the mobile station in the association list according to the GTK request when the preset delay time period after the arrival of the updating period of the GTK arrives.

It should be noted that, in the embodiment of the present invention, a possible implementation manner is:

the updating unit 602 is further configured to add a newly associated mobile station into the association list when a mobile station associates with the access point;

the receiving unit 603 is further configured to receive a GTK request sent by the newly associated mobile station; and the sending unit 604 is further configured to send both an old GTK and the updated GTK to the newly associated mobile station when the access point has updated the GTK but still uses the old GTK, so that the newly associated mobile station uses the old GTK when the preset delay time period after the arrival of the updating period of the GTK does not arrive, and uses the updated GTK after the preset delay time period after the arrival of the updating period of the GTK arrives.

It should be noted that, in the embodiment of the present invention, another possible implementation manner is:

the updating unit 602 is further configured to add a newly associated mobile station into the association list when a mobile station associates with the access point;

the receiving unit is further configured to receive a GTK request sent by the newly associated mobile station; and the sending unit 604 is further configured to send an old GTK to the newly associated mobile station when the access point has not updated the GTK and stills uses the old GTK, so that the newly associated mobile station uses the old GTK when the preset delay time period after the arrival of the updating period of the GTK does not arrive, and sends a GTK request to the access point within the preset delay time period after the arrival of the updating period of the GTK.

It should be noted that information exchange and an execution process between units of the apparatus are based on the same concept as those of the method embodiments of the present invention. The technical effects are the same as those of the method embodiments of the present invention. For details, reference may be made to the description of the method embodiments illustrated in the foregoing embodiments of the present invention, which are not detailed herein again.

In the embodiment of the present invention, a period setting unit sets an updating period of a GTK, and an updating unit periodically updates the GTK. After a receiving unit receives a GTK request sent by a mobile station associated with the access point, a sending unit sends the updated GTK to the mobile station, so that it is unnecessary to update the GTK whenever a mobile station leaves the access point, thereby avoiding update frequent of the GTK, and preventing the access point from working with an overload.

Figure 7:
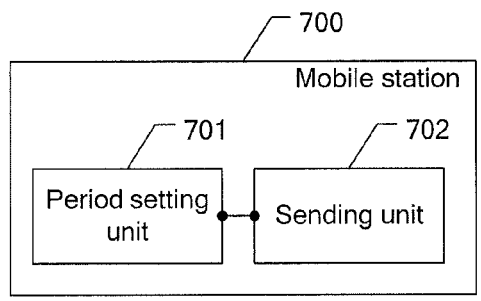
FIG. 7 is a schematic diagram of a composition structure of a mobile station according to an embodiment of the present invention.

The foregoing embodiment describes an interactive process between an access point and a mobile station with an access point end working as an executor. The following describes a case that a mobile station end is used as an executor in detail. Referring to FIG. 7, an embodiment of the present invention provides a mobile station 700, including:

a period setting unit 701, configured to set a requesting period of a group temporal key GTK; and a sending unit 702, configured to send, within a preset delay time period each time after arrival of the requesting period of the GTK, a GTK request to an access point AP associated with the mobile station, so that the access point assigns a GTK to the mobile station, where an updating period of the GTK set by the access point is the same as the requesting period of the GTK.

It should be noted that, in the embodiment of the present invention, for the mobile station 700, a possible implementation manner is: The mobile station 700 may further include (not shown in FIG. 7): a first receiving unit, where the sending unit 701 is further configured to send a GTK request to the access point when the mobile station associates with the access point; and the first receiving unit is configured to receive an updated GTK and an old GTK that is still used, where the updated GTK and the old GTK are sent by the access point, so that the mobile station uses the old GTK when the preset delay time period after the arrival of the requesting period of the GTK does not arrive, and uses the updated GTK after the preset delay time period after the arrival of the requesting period of the GTK arrives.

It should be noted that, in the embodiment of the present invention, for the mobile station 700, another possible implementation manner is: The mobile station 700 may further include (not shown in FIG. 7): a second receiving unit, where the sending unit 702 is further configured to send a GTK request to the access point when the mobile station associates with the access point;

the second receiving unit is configured to receive an old GTK that is still used and sent by the access point, so that the mobile station uses the old GTK when the preset delay time period after the arrival of the requesting period of the GTK does not arrive; and the sending unit 702 is further configured to send, within the preset delay time period after the arrival of the requesting period of the GTK, a GTK request to the access point.

In the embodiment of the present invention, a period setting unit sets a requesting period of a GTK, and an access point sets an updating period of the GTK and periodically updates the GTK. After a sending unit sends a GTK request, the access point sends the updated GTK to a mobile station, and it is unnecessary to update the GTK whenever a mobile station leaves the access point, thereby avoiding frequent update of the GTK, and preventing the access point from working with an overload.

Figure 8:
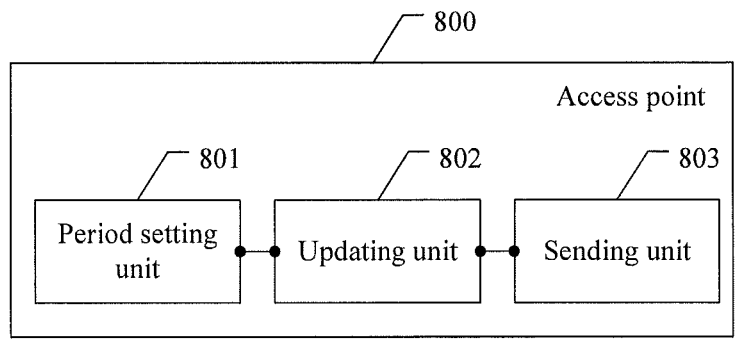
FIG. 8 is a schematic diagram of a composition structure of another access point according to an embodiment of the present invention.

The foregoing embodiments introduce an access point and a mobile station. The following introduces another access point provided in an embodiment of the present invention. As shown in FIG. 8, the access point 800 includes:

a period setting unit 801, configured to set an updating period of a group temporal key GTK;

an updating unit 802, configured to update the GTK whenever the updating period of the GTK arrives; and a sending unit 803, configured to send the updated GTK to a mobile station STA in an association list after the update of the GTK is completed, where the association list records all mobile stations communicating with the access point.

It should be noted that, in the embodiment of the present invention, for the updating unit 802, a possible implementation manner is:

the updating unit 802 is further configured to delete a leaving mobile station from the association list when a mobile station leaves the coverage of the access point, so that the updated GTK is not sent to the leaving mobile station when the updating period of the GTK arrives.

It should be noted that, in the embodiment of the present invention, for the updating unit 802, another possible implementation manner is:

the updating unit 802 is further configured to add a newly associated mobile station into the association list when a mobile station associates with the access point.

In the embodiment of the present invention, a period setting unit sets an updating period of a GTK, and an updating unit periodically updates the GTK. After the update of the GTK is completed, a sending unit sends the updated GTK to a mobile station associated with the access point, so that it is unnecessary to update the GTK whenever a mobile station leaves the access point, thereby avoiding frequent update of the GTK, and preventing the access point from working with an overload.

The following introduces an application scenario for an access point and a mobile station provided in the embodiments of the present invention. For example, the access point and the mobile station may specifically be applied to a system for updating a group temporal key in a WiFi network, where the system may include:

the access point according to the embodiment shown in FIG. 6 and the mobile station according to the embodiment shown in FIG. 7.

In a practical application, the system for updating a group temporal key in a WiFi network may specifically include:

a server on a network side, configured to maintain a mapping between an access point and a mobile station and provide traffic information;

a plurality of access points, connected to the server on the network side and configured to provide the traffic information to a mobile station and update a GTK for the mobile station; and a plurality of mobile stations, wirelessly connected to an access point and configured to obtain the traffic information from the server on the network side through the access point.

Figure 9:
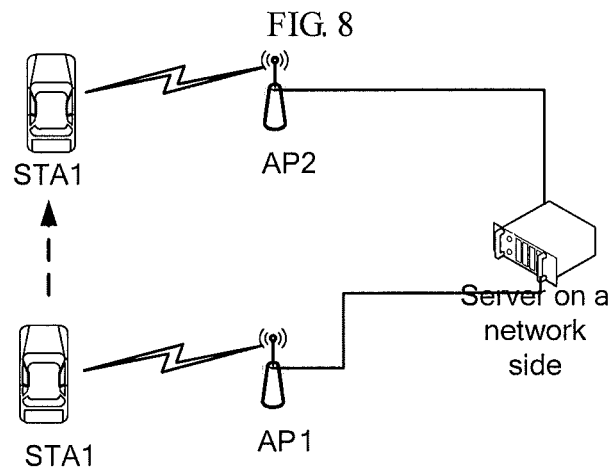
FIG. 9 is a schematic diagram of an application scenario of an access point and a mobile station according to an embodiment of the present invention.

To describe the system for updating a group temporal key provided in the embodiment of the present invention in detail. Referring to FIG. 9, the server on the network side is connected to an AP1 and an AP2. A mobile station STA1 is installed in a car, and first the STA1 exists in the coverage of the AP1. After the car is driven for a certain distance, the STA1 leaves the coverage of the AP1, and enters the coverage of the AP2, where the method for updating a GTK implemented by the AP1 and the AP2 may specifically be the method described in the foregoing embodiments.

Figure 10:
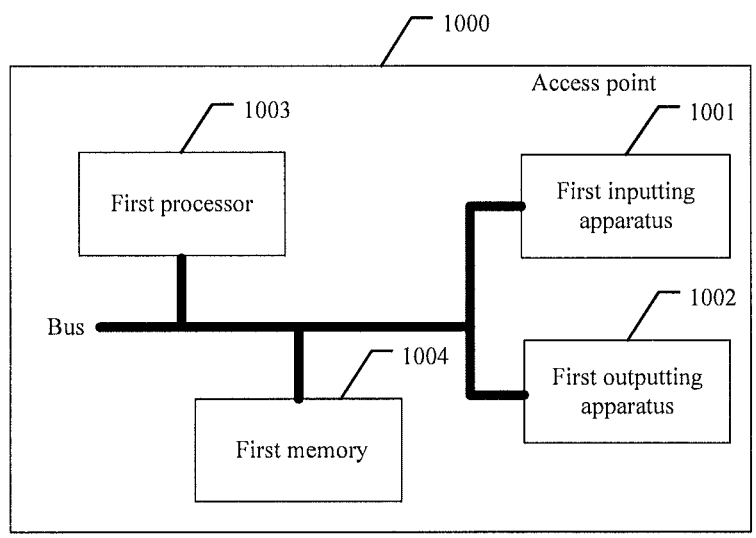
FIG. 10 is a schematic diagram of a composition structure of another access point according to an embodiment of the present invention.

The following introduces another access point provided in an embodiment of the present invention. Referring to FIG. 10, the access point 1000 includes:

a first inputting apparatus 1001, a first outputting apparatus 1002, a first processor 1003, and a first memory 1004 (where the number of first processors 1003 in the access point 1000 may be one or multiple, and in FIG. 10, one processor is taken as an example). In some embodiments of the present invention, the first inputting apparatus 1001, the first outputting apparatus 1002, the first processor 1003, and the first memory 1004 may be connected by using a bus or in another manner, and in FIG. 10, that a connection is performed by using a bus is taken as an example.

The first processor 1003 is configured to perform the following steps: setting an updating period of a group temporal key GTK, and saving it in the first memory 1004; updating the GTK whenever the updating period of the GTK arrives and saving it in the first memory 1004; and calculating a preset delay time period after arrival of the updating period of the GTK, and saving it in the first memory 1004.

The first outputting apparatus 1001 is configured to receive a GTK request that is sent by a mobile station STA in an association list within the preset delay time period after the arrival of the updating period of the GTK.

The first memory 1004 is further configured to save all mobile stations that are communicating with the access point and are recorded in the association list, where the preset delay time period is shorter than the updating period of the GTK.

The first outputting apparatus 1002 is configured to send the updated GTK to the mobile station in the association list according to the GTK request when the preset delay time period after the arrival of the updating period of the GTK arrives.

In some embodiments of the present invention, the first processor 1003 is further configured to add a newly associated mobile station into the association list when a mobile station associates with the access point, and save the update to the association list in the first memory 1004;

and determine whether the access point has updated the GTK but still uses an old GTK.

The first inputting apparatus 1001 is further configured to receive a GTK request sent by the newly associated mobile station.

The first outputting apparatus 1002 is further configured to send both the old GTK and the updated GTK to the newly associated mobile station when the access point has updated the GTK but still uses the old GTK, so that the newly associated mobile station uses the old GTK when the preset delay time period after the arrival of the updating period of the GTK does not arrive, and uses the updated GTK after the preset delay time period after the arrival of the updating period of the GTK arrives.

In some embodiments of the present invention, the first processor 1003 is further configured to add a newly associated mobile station into the association list when a mobile station associates with the access point, and save the update to the association list in the first memory 1004; and determine whether the access point has not updated the GTK but still uses an old GTK.

The first inputting apparatus 1001 is further configured to receive a GTK request sent by the newly associated mobile station.

The first outputting apparatus 1002 is further configured to send the old GTK to the newly associated mobile station when the access point has not updated the GTK but still uses the old GTK, so that the newly associated mobile station uses the old GTK when the preset delay time period after the arrival of the updating period of the GTK does not arrive, and sends a GTK request to the access point within the preset delay time period after the arrival of the updating period of the GTK.

Figure 11:
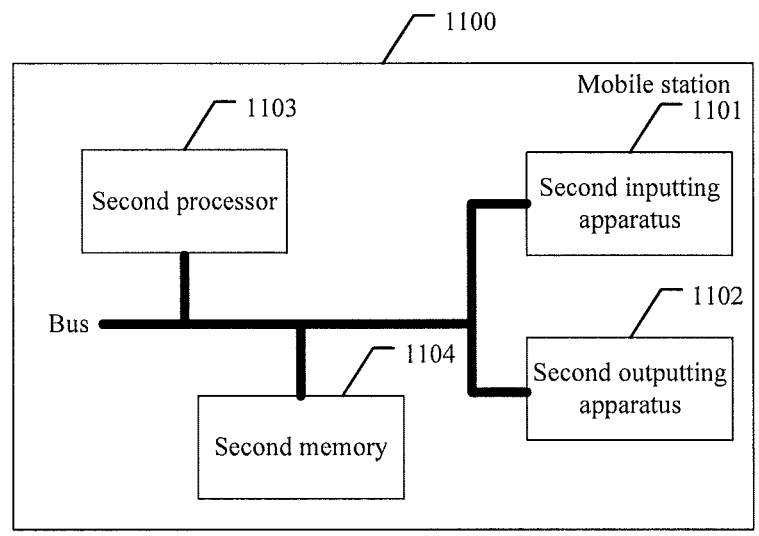
FIG. 11 is a schematic diagram of a composition structure of another mobile station according to an embodiment of the present invention.

The following introduces another mobile station provided in an embodiment of the present invention. Referring to FIG. 11, the mobile station 1100 includes:

a second inputting apparatus 1101, a second outputting apparatus 1102, a second processor 1103, and a second memory 1104 (where the number of second processors 1103 in the mobile station 1100 may be one or multiple, and in FIG. 11, one processor is taken as an example). In some embodiments of the present invention, the second inputting apparatus 1101, the second outputting apparatus 1102, the second processor 1103, and the second memory 1104 may be connected by using a bus or in another manner, and in FIG. 11, that a connection is performed by using a bus is taken as an example.

The second processor 1103 is configured to perform the following steps: setting a requesting period of a group temporal key GTK, where a set updating period of the GTK is the same as the requesting period of the GTK, and saving it in the second memory 1104; and calculating a preset delay time period each time after the requesting period of the GTK arrives, and saving it in the second memory 1104.

The second outputting apparatus 1102 is configured to send, within the preset delay time period each time after arrival of the requesting period of the GTK, a GTK request to an access point AP associated with the mobile station; and the second memory 1104 is further configured to save the GTK request.

The second inputting apparatus 1101 is configured to receive a GTK assigned by the access point to the mobile station.

In some embodiments of the present invention, the second processor 1103 is further configured to determine whether the mobile station associates with the access point, and save a determination result in the second memory 1104.

The second outputting apparatus 1102 is further configured to send a GTK request to the access point when the mobile station associates with the access point.

The second inputting apparatus 1101 is further configured to receive an updated GTK and an old GTK that is still used, where the updated GTK and the old GTK are sent by the access point, so that the mobile station uses the old GTK when the preset delay time period after the arrival of the requesting period of the GTK does not arrive, and uses the updated GTK after the preset delay time period after the arrival of the requesting period of the GTK arrives.

In some embodiments of the present invention, the second processor 1103 is further configured to determine whether the mobile station associates with the access point, and save a determination result in the second memory 1104.

The second outputting apparatus 1102 is further configured to send a GTK request to the access point when the mobile station associates with the access point.

The second inputting apparatus 1101 is further configured to receive the old GTK that is still used and sent by the access point, so that the mobile station uses the old GTK when the preset delay time period after the arrival of the requesting period of the GTK does not arrive, and sends a GTK request to the access point within the preset delay time period after the arrival of the requesting period of the GTK.

Figure 12:
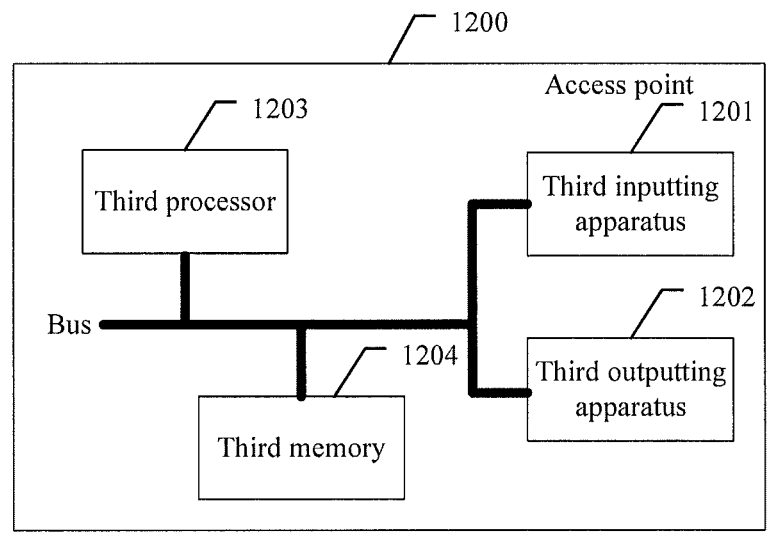
FIG. 12 is a schematic diagram of a composition structure of another access point according to an embodiment of the present invention.

The following introduces another access point provided in an embodiment of the present invention. Referring to FIG. 12, the access point 1200 includes:

a third inputting apparatus 1201, a third outputting apparatus 1202, a third processor 1203, and a third memory 1204 (where the number of third processors 1203 in the access point 1200 may be one or multiple, and in FIG. 12, one processor is taken as an example). In some embodiments of the present invention, the third inputting apparatus 1201, the third outputting apparatus 1202, the third processor 1203, and the third memory 1204 may be connected by using a bus or in another manner, and in FIG. 12, that a connection is performed by using a bus is taken as an example.

The third processor 1203 is configured to perform the following steps: setting an updating period of a group temporal key GTK, and saving it in the third memory 1204; calculating the updating period of the GTK, and saving it in the third memory 1204; and updating the GTK whenever the updating period of the GTK arrives and saving it in the third memory 1204.

The third memory 1204 is configured to save an association list, where the association list records all mobile stations communicating with the access point.

The third inputting apparatus 1201 is configured to input the association list saved in the third memory 1204 into the third outputting apparatus 1202.

The third outputting apparatus 1202 is configured to send the updated GTK to a mobile station in the association list.

In some embodiments of the present invention, the third processor 1203 is further configured to delete a leaving mobile station from the association list when a mobile station leaves the coverage of the access point, so that the updated GTK is not sent to the leaving mobile station when the updating period of the GTK arrives, and save an updating result of the association list in the third memory 1204.

In some embodiments of the present invention, the third processor 1203 is further configured to add a newly associated mobile station into the association list when a mobile station associates with the access point, and save an updating result of the association list in the third memory 1204.

Persons of ordinary skill in the art may understand that all or a part of the steps of the methods in the foregoing embodiments may be implemented by a program instructing relevant hardware. The program may be stored in a computer readable storage medium. The foregoing storage medium may be a read-only memory, a magnetic disk, or an optical disk.

The method for updating a group temporal key, and the related apparatus and system provided in the present invention are described in the foregoing in detail. Persons of ordinary skill in the art may make variations to both a specific implementation manner and an application scope according to the ideas of the embodiments of the present invention. In conclusion, content of the specification shall not be understood as a limitation to the present invention.

What is claimed is:

1. A method for updating a group temporal key, comprising:
    setting, by an access point (AP), an updating period of a group temporal key (GTK);
    updating, by the AP, the GTK whenever the updating period of the GTK occurs;
    receiving, by the AP, a GTK request that is sent by a mobile station (STA) in an association list within a preset delay time period shorter than the updating period of the GTK, wherein the association list records all mobile stations communicating with the AP;
    sending, by the AP, the updated GTK to the mobile stations in the association list according to the GTK request sent by the STA when determining the GTK request sent by the STA is sent within the preset delay time period after the updating period of the GTK occurs;
    adding, by the AP, a new mobile station into the association list when the new mobile station associates with the AP;
    receiving, by the AP, a GTK request sent by the new mobile station; and
    sending, by the AP, an old GTK to the new mobile station when the AP has not updated the GTK and stills uses the old GTK, so that the new mobile station uses the old GTK prior to the preset delay time period which occurs after the updating period of the GTK, and sends a GTK request to the AP within the preset delay time period which occurs after the updating period of the GTK.

2. The method according to claim 1, further comprising:
    sending, by the AP, both the old GTK and the updated GTK to the new mobile station when the AP has updated the GTK but still uses the old GTK, so that the new mobile station uses the old GTK prior to the preset delay time period which occurs after the updating period of the GTK, and uses the updated GTK after the preset delay time period which occurs after the updating period of the GTK.

3. A method for updating a group temporal key, comprising:
setting, by a first mobile station (STA), a requesting period of a GTK; and
sending, by the first STA a GTK request to an access point (AP) associated with the first STA in an association list, so that the AP assigns a GTK to the first STA when determining the GTK request is sent within a preset delay period after occurrence of the requesting period of the GTK, wherein an updating period of the GTK set by the AP is the same as the requesting period of the GTK,
wherein a new mobile station is added to the association list when the new mobile station associates with the AP,
wherein when the new mobile station sends a GTK request, an old GTK is sent to the new mobile station when the AP has not updated the GTK and stills uses the old GTK, so that the new mobile station uses the old GTK prior to the preset delay period which occurs after the updating period of the GTK, and sends a GTK request to the AP within the preset delay period which occurs after the updating period of the GTK.

4. The method according to claim 3, further comprising:
sending, by a second mobile station (STA), a GTK request to the AP when the second STA associates with the AP; and
receiving, by the second STA, an updated GTK and the old GTK that is still used, wherein the updated GTK and the old GTK are sent by the AP, so that the second STA uses the old GTK prior to the preset delay time period which occurs after the requesting period of the GTK, and uses the updated GTK after the preset delay time period which occurs after the requesting period of the GTK.

5. The method according to claim 3,
wherein the second STA uses the old GTK prior to the preset delay time period which occurs after the requesting period of the GTK, and sends a GTK request to the AP within the preset delay time period after the requesting period of the GTK.

6. An access point (AP), comprising:
at least one processor configured to implement:
a period setting unit, configured to set an updating period of a group temporal key (GTK);
an updating unit, configured to update the GTK whenever the updating period of the GTK occurs;
a receiving unit, configured to receive a GTK request that is sent by a mobile station (STA) in an association list within a preset delay time period is shorter than the updating period of the GTK, wherein the association list records all mobile stations communicating with the access point; and
a sending unit, configured to send the updated GTK to the mobile stations in the association list according to the GTK request sent by the STA when determining the GTK request sent by the STA is sent within the preset delay time period after of the updating period of the GTK occurs,
wherein the updating unit is further configured to add a new mobile station into the association list when the new mobile station associates with the access point; the receiving unit is further configured to receive a GTK request sent by the new mobile station; and
the sending unit is further configured to send both an old GTK and the updated GTK to the new mobile station when the access point has updated the GTK but still uses the old GTK, so that the new mobile station uses the old GTK prior to the preset delay time period which occurs after the updating period of the GTK, and uses the updated GTK after the preset delay time period which occurs after the updating period of the GTK.

7. The access point according to claim 6, wherein, the sending unit is further configured to send the old GTK to the new mobile station when the access point has not updated the GTK and stills uses the old GTK, so that the new mobile station uses the old GTK prior to the preset delay time period which occurs after the updating period of the GTK, and sends a GTK request to the access point within the preset delay time period after the updating period of the GTK.

8. A mobile station (STA), comprising:
at least one processor configured to implement:
a period setting unit, configured to set a requesting period of a group temporal key (GTK); and
a sending unit, configured to send a GTK request to an access point (AP) associated with the STA, so that the AP assigns a GTK to the STA when determining the GTK request is sent within a preset delay period after occurrence of the requesting period of the GTK, wherein an updating period of the GTK set by the access point is the same as the requesting period of the GTK,
wherein a new mobile station is added to the association list when the new mobile station associates with the AP, and a GTK request is sent by the new mobile station, and
wherein an old GTK is sent to the new mobile station when the AP has not updated the GTK and stills uses the old GTK, so that the new mobile station uses the old GTK prior to the preset delay period which occurs after the updating period of the GTK, and sends a GTK request to the AP within the preset delay period which occurs after the updating period of the GTK.

9. A mobile station (STA), comprising:
at least one processor configured to implement:
a period setting unit, configured to set a requesting period of a group temporal key (GTK);
a sending unit, configured to send a GTK request to an access point (AP) when the STA associates with the AP, so that the AP assigns a GTK to the STA when determining the GTK request is sent within a preset delay period after occurrence of the requesting period of the GTK,
wherein an updating period of the GTK set by the AP is the same as the requesting period of the GTK; and
a first receiving unit, configured to receive an updated GTK and an old GTK that is still used, wherein the updated GTK and the old GTK are sent by the AP, so that the STA uses the old GTK prior to the preset delay time period which occurs after the requesting period of the GTK, and uses the updated GTK after the preset delay time period which occurs after the requesting period of the GTK occurs;
wherein a new mobile station is added to the association list when the new mobile station associates with the AP, and a GTK request is sent by the new mobile station, and
wherein the old GTK is sent to the new mobile station when the AP has not updated the GTK and stills uses the old GTK, so that the new mobile station uses the old GTK prior to the preset delay time period which occurs after the updating period of the GTK, and sends a GTK request to the AP within the preset delay time period which occurs after the updating period of the GTK.

10. A mobile station (STA), comprising:
at least one processor configured to implement:

a period setting unit, configured to set a requesting period of a group temporal key (GTK);

a sending unit, configured to send a GTK request to an access point (AP) when the STA associates with the AP, so that the AP assigns a GTK to the STA when determining the GTK request is sent within a preset delay period after occurrence of the requesting period of the GTK, wherein an updating period of the GTK set by the AP is the same as the requesting period of the GTK;

a second receiving unit, configured to receive an old GTK that is still used and sent by the AP, so that the STA uses the old GTK prior to the preset delay time period which occurs after the requesting period of the GTK, and wherein the sending unit is further configured to send a GTK request to the AP within the preset delay time period which occurs after the requesting period of the GTK;

wherein a new mobile station is added to the association list when the new mobile station associates with the AP, and a GTK request is sent by the new mobile station, and wherein the old GTK is sent to the new mobile station when the AP has not updated the GTK and stills uses the old GTK, so that the new mobile station uses the old GTK prior to the preset delay time period which occurs after the updating period of the GTK, and sends a GTK request to the AP within the preset delay time period which occurs after the updating period of the GTK.

11. A system for updating a group temporal key, comprising:

a mobile station (STA);

an access point (AP) including:

a period setting unit, configured to set an updating period of a group temporal key (GTK);

an updating unit, configured to update the GTK whenever the updating period of the GTK occurs;

a receiving unit, configured to receive a GTK request that is sent by a mobile station (STA) in an association list within a preset delay time period is shorter than the updating period of the GTK, wherein the association list records all mobile stations communicating with the access point; and a sending unit, configured to send the updated GTK to the mobile stations in the association list according to the GTK request sent by the STA when the GTK request sent by the STA is within the preset delay time period after the updating period of the GTK occurs;

the STA, including:

a period setting unit, configured to set a requesting period of the GTK; and a sending unit, configured to send a GTK request to the AP associated with the STA, so that the AP assigns a GTK to the STA when determining the GTK request is sent within the preset delay period after occurrence of the requesting period of the GTK, wherein an updating period of the GTK set by the AP is the same as the requesting period of the GTK;

wherein the AP adds a new mobile station into the association list when the new mobile station associates with the access point, and the AP receives a GTK request sent by the new mobile station, and wherein the AP sends an old GTK to the new mobile station when the access point has not updated the GTK and stills uses the old GTK, so that the new mobile station uses the old GTK prior to the preset delay time period which occurs after the updating period of the GTK, and sends a GTK request to the AP within the preset delay time period which occurs after the updating period of the GTK.

\* \* \* \* \*